United States Patent Office 2,852,446
Patented Sept. 16, 1958

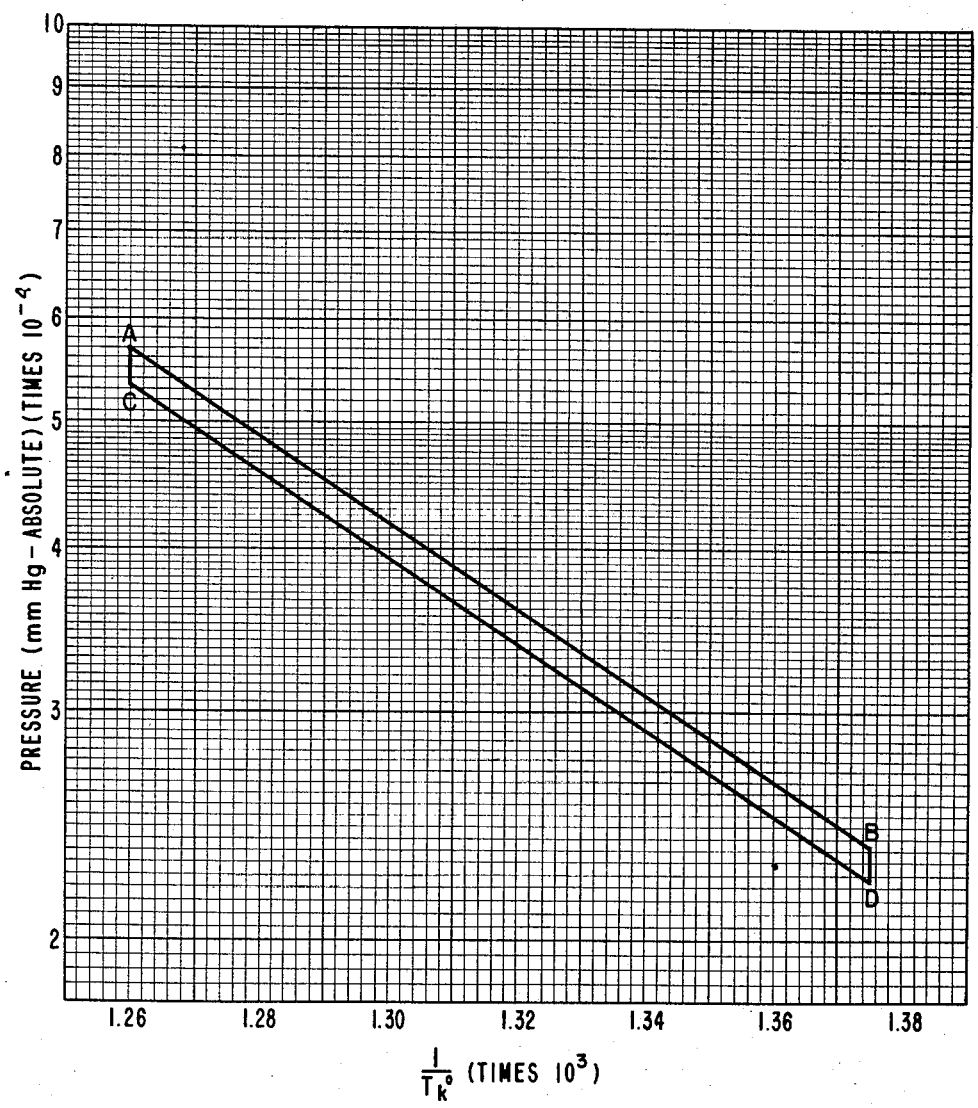

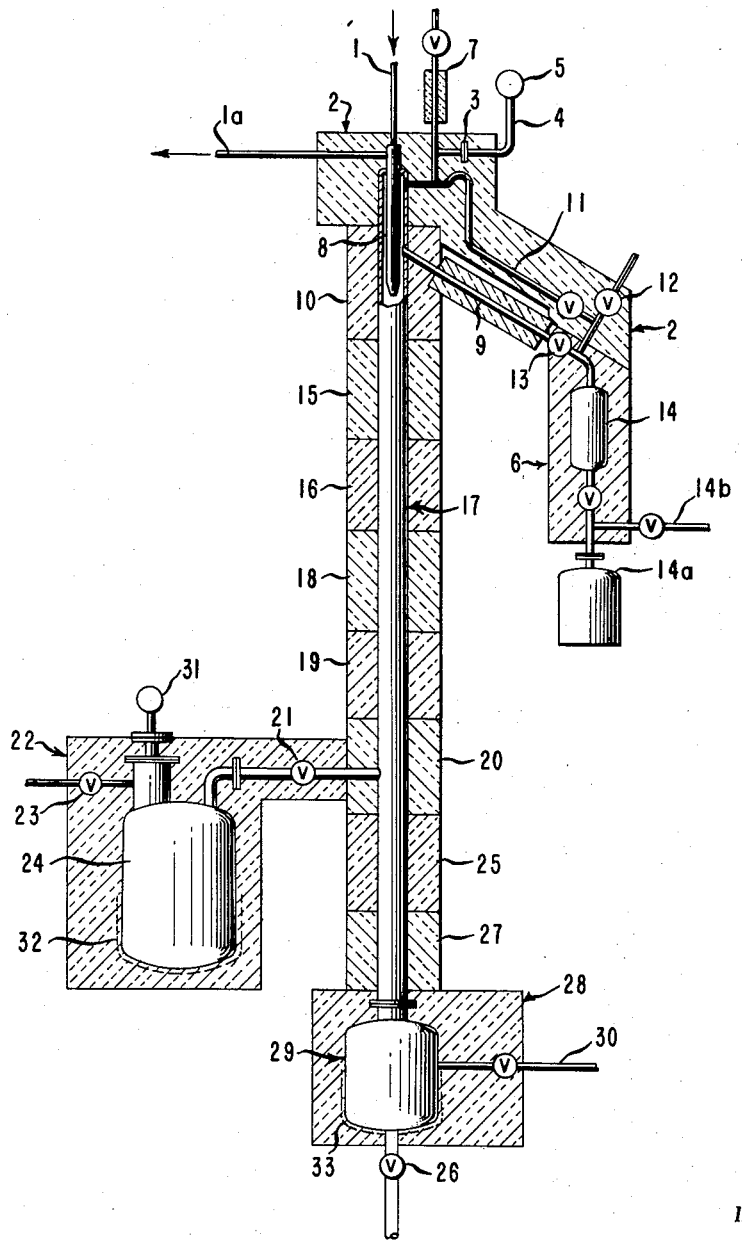

2,852,446

PURIFICATION OF ZIRCONIUM TETRACHLO-
RIDES BY FRACTIONAL DISTILLATION

Marvin L. Bromberg, Wilmington, Del., assignor to E. I.
du Pont de Nemours and Company, Wilmington, Del.,
a corporation of Delaware Application December 7, 1956, Serial No. 626,991

5 Claims. (Cl. 202—39)

This invention relates to the purification of zirconium and hafnium. More particularly it concerns a method for the separation of hafnium from zirconium, particularly by separation of the tetrachlorides of these metals from each other.

Zirconium and hafnium metals have utility as refractory metals particularly where high resistance to oxidation is desired in addition to high melting point. These metals, in the form of their chemical compounds, e. g., as oxygen-containing compounds of the metals, occur together in the raw materials used for their production but it is difficult to separate them from each other under normal processing for the production of the metals. For nuclear engineering applications, purity of the metals, especially zirconium substantially free of hafnium, i. e., zirconium metal containing 0.01% or less of hafnium, is a critical requirement. Extensive effort has been applied to the problem of providing means to separate hafnium compounds from zirconium compounds and thereby to provide the desired purity. The tetrahalides, especially the tetrachlorides, have been preferred compounds used in the reduction reactions for the production of zirconium and hafnium in the metallic form, because of the great difficulty in completely removing the deleterious oxygen from the metal product during reduction of the oxygen-containing compounds of the metals. Zirconium tetrachloride and hafnium tetrachloride are solids at normal temperatures and sublime when heated under normal pressure. The separation, handling, and metering of solid compounds present very difficult problems and most of the separation processes have utilized chemical additives to eliminate some of the above problems. Small differences in the vapor pressure between various hafnium and zirconium compounds and complexes have been observed and numerous attempts have been made to exploit these differences to make an economical separation. In these attempts, complex systems such as the double chlorides $2ZrCl_4$—$2PCl_5$ and $2HfCl_4$—$2PCl_5$ and oxy-chlorides $3ZrCl_4$—$2POCl_3$ and $3HfCl_4$—$2POCl_3$ were employed. The difference in volatility of these hafnium and zirconium compounds is so small as to make their separation difficult and expensive, and, furthermore, the product obtained from this type of processing is not suitable, because of the presence of substantial amounts of phosphorus, among other things, for direct use in metallurgical reduction operations, but requires extensive additional processing. These factors combine to render such processes uneconomical.

One object of this invention is to provide a process for the separation of hafnium tetrachloride from zirconium tetrachloride. Another object is to provide high purity zirconium compounds, especially of low hafnium content, which are particularly well adapted to the production of pure zirconium metal. Another object is the enrichment and ultimate isolation of hafnium tetrachloride from its mixtures with zirconium tetrachloride. Another object is to provide a process for directly yielding purified products free of any ancillary reagents requiring further operational steps prior to the metallurgical steps used to produce the free metals. Other objects will appear hereinafter.

In the drawings, Fig. 1 is a graph of absolute pressures in millimeters of mercury times $10^{-4}$ (as ordinates on a $\log_{10}$ scale) against the reciprocal of (absolute) temperatures times $10^3$ in degrees Kelvin (as abscissae on an arithmetic scale), illustrating an area preferred for the practice of this invention; and Fig. 2 is a schematic view of a form of apparatus which may be used in the practice of this invention.

The above objects and additional advantages of this invention are attained by subjecting a fluid mixture of the tetrachlorides of zirconium and hafnium to fractional distillation under pressure equal to the equilibrium vapor pressure in the fractionating zone, regulating the pressure in the range of 30 to 75 atm. absolute and the temperature of the boiling liquid in the high temperature end or base of the fractionating zone in the range of 455° C. up to 520° C. A product relatively low in hafnium content is recovered from the hot end of the fractionating zone and a product enriched in hafnium from the low temperature end.

More precisely, this invention provides a method for obtaining substantially pure zirconium tetrachloride, e. g., zirconium tetrachloride containing less than .01% $HfCl_4$, from its mixtures with hafnium tetrachloride which comprises subjecting a fluid mixture of the tetrachlorides of zirconium and hafnium to fractional distillation in a closed fractionating or rectifying zone under pressure while maintaining the maximum temperature of the hot end of the fractionating zone in the range of from 455° C. to 520° C. and controlling the absolute pressure in the fractionating zone relative to said hot end temperature at an equilibrium value not less than 97% and not more than 103% of the values indicated by the equation:

$$\log_{10} P \text{ mm. Hg} = \frac{-3406}{T_K°} + 9.0421$$

in which P mm. Hg signifies absolute pressure in millimeters of mercury and $T_K°$ signifies (absolute) temperature in degrees Kelvin.

The above equation relates the absolute equilibrium vapor pressures (i. e., pressures at the boiling point) for substantially pure $ZrCl_4$, to absolute temperature in the zirconium rich or hot end of the fractionation zone. The preferred operating range is illustrated by the area ABCD in Fig. 1, which is a graph of the (absolute) pressures in millimeters of mercury (times $10^{-4}$), as ordinates (plotted on a $\log_{10}$ scale) from 97% to 103% of that determined by the above formula, against $$\frac{1}{T_K°}$$

(times $10^3$) as abscissae (plotted on an arithmetic scale); in this area ABCD, the absolute pressures vary in a straight line on the upper line AB from about $5.69 \times 10^4$ mm. Hg to about $2.37 \times 10^4$ mm. Hg and on the lower line CD from about $5.35 \times 10^4$ mm. Hg to about $2.23 \times 10^4$ mm. Hg and with $$\frac{1}{T_K°}$$

[reciprocal of (absolute) temperature in degrees Kelvin] varying in a straight line from about $1.26 \times 10^{-3}$ (for 520° C.) to about $1.375 \times 10^{-3}$ (for 455° C.). The variation of 3% above and below the precise equation allows for reasonable experimental error in determining the equation constants and for changes in boiling point due to variations in the composition of the feed mixture and to minor constitutents other than $ZrCl_4$ and $HfCl_4$.

More specifically, this invention comprises feeding a fluid, preferably vaporous, mixture of halides comprising zirconium tetrachloride and hafnium tetrachloride into a rectifying zone in which rising vapors are caused to contact a down flowing liquid phase, heating to maintain the temperature of the liquid phase in the lowest portion of said zone (the hot end) at a boiling temperature of at least 455° C., but not more than 520° C., regulating the pressure in said zone at a value equal to the vapor pressure of the liquid phase in said zone, continuing the heating of said liquid phase in said lowest portion and withdrawing a product relatively enriched in hafnium from the upper portion of said zone and zirconium tetrachloride relatively free of hafnium from the lowest portion of said zone.

In a preferred embodiment the invention comprises injecting a fluid, preferably vaporous, mixture comprised substantially solely of zirconium tetrachloride and hafnium tetrachloride into an intermediate section of a distilling column operated at a pressure, preferably autogenous, of from about 25,000 to about 50,000 mm. Hg abs., minimizing heat transfer to and from the column by means of insulation and regulated heating elements, providing cooling means at the top of the column to effect condensation of vapors at temperatures above the freezing point of the distillate to form a downward flow of liquid metal chlorides in the column, heating to boil the liquid beneath the column within the temperature range of from 460 to 512° C. to form vapors which rise in countercurrent contact with the liquid stream in the column, withdrawing a substantially hafnium-free zirconium tetrachloride product from the lower portion of the column and a product enriched in hafnium from the top of the column. The temperatures in the still head preferably are kept at at least 440° C. to prevent plugging. By providing a sufficient length of column, i. e., one having at least 30 theoretical plates, and preferably operating with a high reflux ratio such as 100:1 (100 parts liquid reflux to 1 part of uncondensed vapor) and pressures of at least 22,800 mm. Hg absolute; this process will serve to isolate substantially pure hafnium tetrachloride and substantially pure zirconium tetrachloride from a mixture of the two.

Figure 2 describes an apparatus in which the process of this invention may be practiced. It is a continuous fractionating device consisting primarily of a packed column 17 into which are introduced distilland vapors boiled from retort 24. Bottoms are collected in still pot 29, which serves also as the reboiler for $ZrCl_4$ condensate. The $ZrCl_4$ product is recovered by withdrawal through valve 26 while the hafnium-rich product is withdrawn from the column top as a vapor, condensed in jacketed pipe 9 to a liquid which is valved to receivers 14 and 14a for recovery. An internal reflux condenser 8 is provided to increase the top reflux ratio. Various externally communicating valves 7, 12, 14b, 23, and 30 provide means for purging the system with an inert gas before the start of the distillation, purge gas generally being introduced through valve 23 and exhausted through valves 12, 23, 30, and 14b. The flow of purging gas can be reversed through these valves if desired. Various parts of the apparatus are enclosed in separately controlled insulated heating zones, 2, 6, 10, 15, 16, 18—20, 22, 25, 27, 28, each provided with thermocouples or other temperature indicating devices by means of which the action of the column is observed. These units serve to minimize heat loss from the apparatus while separate heating elements 32 and 33 (shown in dotted lines) effect and control the boiling. Thermocouple wells, not shown, are usually placed in each section of the column, under the reflux condenser, in both inlet and outlet of the jacket of condenser 8, in the jacket of take-off pipe 9, and in the still head vapor space near the outlet 9. Condenser 8 and pipe 9 are cooled by heat transfer fluids capable of operating at temperatures up to about 500° C. In operation, the flow of coolant 8 is so regulated that the inner surface of still head is below the boiling point, but not below the melting point, of the distillate in order to effect a liquid reflux. The coolant for 9 is also similarly regulated with respect to the melting point of the distillate but may be kept above the boiling point of the distillate until takeoff of condensate is desired. When the cooling system in 8 or 9 has a high heat transfer characteristic the coolant temperature is usually kept above the distillate freezing point. With systems and coolants of low heat transfer properties the coolant temperature may be considerably lower but the flow is so controlled that heat removal does not drop the inner surface temperature below the distillate freezing point. Details of the figure are listed for convenience in numerical sequence of the apparatus elements as follows:

1. Cooling fluid inlet to condenser 8.
1A. Cooling fluid outlet from condenser 8.
2. Insulated heating zone to keep still head at at least about 440° C. to prevent solidification of metal halides in still head assembly and preferably above the boiling point of the distillate.
3. A diaphragm to transmit pressure changes to 4.
4. Liquid filled tube.
5. Pressure gauge.
6. Insulated heating zone (abutting 2) held just above melting point of distillate.
7. Vent line with valve for purging, jacketed to condense distillate to liquid.
8. Reflux condenser.
9. Jacketed distillate take-off pipe.
10. Insulated heating zone held close to desired head temperature.
11. Pressure equalizing line to assist withdrawal of liquid distillate from 9 into receiver 14.
12. Purge or vent line with valve.
13. Take-off valve which may be a calibrated or metering valve.
14. Liquid distillate receiver from which condensate is periodically transferred to 14a.
14a. Replaceable container.
14b. Vent line with valve between receivers 14 and 14a.
15. Insulated column heating zone.
16. Insulated column heating zone.
17. Packed distilling column made of heavy walled stainless steel.
18. Insulated column heating zone.
19. Insulated column heating zone.
20. Insulated column heating zone.
21. Valve to adjust feed, closed during reloading of 24.
22. Insulated heating zone for inboiler 24.
23. Valve, for venting and/or admitting purging gas.
24. Boiler or vaporizer for the crude distilland.
25. Insulated column heating zone, held near boiling point of pure $ZrCl_4$.
26. $ZrCl_4$ take-off connected to a receiver assembly, not shown, but may be similar to 14 and 14a.
27. Insulated column heating zone.
28. Insulated still pot thermal zone.
29. Still pot or reboiler.
30. Purge line with valve.
31. Diaphragm connected pressure gauge mounted on cover flange.
32. Heating elements to effect boiling of vessel 24.
33. Heating elements to effect boiling of vessel 29.

*Example I*

A suitable still similar to that shown in Fig. 2 was constructed of type 316 stainless steel and designed for service under 750 p. s. i. g. (pounds per square inch gage) at temperatures up to about 550° C. A column 17 of 26 ft. height and 3 inches internal diameter containing a standard packing chemically resistant to the metal chloride and thermally stable, such as stainless steel coils or ceramic saddles, provides satisfactory separation of a pure $ZrCl_4$ product on a commercial scale. An inboiler 24 of about 70 gal. capacity and a smaller, 18 gal., still pot 29 were used. The cooling jackets for condensers 7, 8, and 9 were supplied with molten heat transfer salts suitable for operation in the 400–500° C. range. For operation, the still was first dried and purged by warming and flushing with argon. A charge of 500 lbs. of a mixture of $ZrCl_4$ and $HfCl_4$ containing 1.6% $HfCl_4$ was transferred to vessel 24 under a protective atmosphere of argon. The cover flange carrying pressure gauge 31 was then bolted on, the vents closed and argon introduced at 23 with valve 21 open to raise the pressure to about 375 p. s. i. g. Cooling salts were then pumped to the jackets of 7 and 8 at 440° C. while the jacket for line 9 was held at about 500° C. The heating zones are then brought to the temperature indicated and in the order listed below.

| Zone | 6 | 2 | 10 | 15 | 16 | 18 | 19 | 20 | 25 | 27 | 28 | 22 |
|---|---|---|---|---|---|---|---|---|---|---|---|---|
| Temp., °C | 435 | 455 | 435 | 435 | 440 | 440 | 445 | 450 | 455 | 460 | 465 | 465 |

During this heating vapors of the metal chlorides began to fill the still and purge gas was vented from the valve at 7 at the pressure reached about 550 p. s. i. g. When substantially all the purge gas was removed as indicated by loss of metal chloride vapors from 7, the pressure was regulated at about 545–550 p. s. i. g. and heat was turned on via elements 33 to keep pot 29 just boiling. Heating elements 32 were then activated and feed was boiled into the column through valve 21. The amount of flow through 21 was determined by pre-calibrated setting and regulating the heating at 32 so that a standard pressure difference of about 5 p. s. i. was maintained between gauge 31 and gauge 5 thus feeding about 50 lbs./hr. to the column. A thermocouple inside the bottom of 24 showed a sharp rise in temperature when the inboiler became empty. Shortly after the feed was started the heat on all column zones except 10 was cut back to 400° C. or below relying on insulation to prevent undue heat loss. Zone 10 was held at 438–440° C. to prevent freezing of the distillate. When sufficient feed was introduced to operate the column a state of total reflux was established as indicated by heat removal through reflux condenser 8 and a substantially steady thermal condition throughout. The head temperature (temperature at the top of the column) was established at the boiling point of the hafnium-rich fraction which in this instance was about 15° C. below the equilibrium temperature measured at the base of the column. When these conditions were established with a pot temperature of about 468° C., cooling fluid at 440° C. was circulated in condenser 9 and distillate collected and periodically discharged to receiver 14 by manipulation of valve 13 and the associated equalizer line valve in line 11. Zirconium tetrachloride containing 0.006% $HfCl_4$ was periodically removed from 29 via 26 into receiver assemblies similar to 14 and 14a. Release of vapor through 30 into an expansion zone and recovery as a condensed solid powder was also found possible and usually gave a purer product. The distillate removed from 14 contained 92% $HfCl_4$. When the charging vaporizer 24 was empty as shown by an internal temperature rise and, usually, a loss of pressure differential, valve 21 was closed, 24 reloaded and brought to pressure and temperature with argon vented through 23, valve 21 was opened and the distillation continued. During loading of 24 take-off at 13 and 26 was suspended and the column kept at complete reflux.

Example II

The process of Example I was repeated using a similar apparatus but operating with liquid instead of vapor feed. To do this the vaporizer 24 in Fig. 2 was replaced with a pressurized melting vessel which discharged by gravity to valve 21 and entered the column as a liquid at about 455° C.–480° C. Good results were obtained when using conditions based on a column base temperature of at least 455° C. If lower pressure was maintained so that the column base temperature fell to around 445° C. local cooling effects resulted in occasional freezing of the charge particularly at discharge ports. When the temperature was raised to 520° C., at the corresponding autogenous pressure, good fractionation was still obtained. However, at higher temperatures the column efficiency began to fail. This was believed due to the proximity to the critical temperature where the relative volatility decreases rapidly.

Example II shows quite clearly that the specific operating conditions of this invention are critical and uniquely suited to the separation of $ZrCl_4$ from $HfCl_4$. Because of the danger of solidification it was found impractical to operate with column base or pot temperatures below about 455° C. Likewise, temperatures in excess of about 520° C. are not desired because of poor separation.

While Example I shows a practical and semi-continuous method of operating this invention to obtain a high purity zirconium product and a product rich in hafnium, higher pressures up to about 1100 p. s. i. may be used. By using longer columns and high reflux ratios substantially pure $HfCl_4$ may be isolated from admixture with $ZrCl_4$ using base temperatures in the range of from 460° C. to 520° C. The low pressure developed at column base temperature below 460° C. results in head temperature dangerously near the freezing point of the pure $HfCl_4$ which interferes with refluxing and take-off.

Also this operation may be conducted in a batch manner as long as the proper temperature and pressure limitations are observed. For example, a mixture of $ZrCl_4$ and $HfCl_4$ may be charged into the still pot 29, placed under a 36 ft. column having no in-boiler 24. By purging and heating to 440° C. and then heating the pot, the column may be brought to a reflux condition with a substantially pure $HfCl_4$ fraction at the still head. To accomplish this a pressure of at least 477 p. s. i. a. (pounds per square inch absolute) and a pot temperature of at least 460° C. is desired. The pure $HfCl_4$ is removed as the first fraction from the top of the column and the $ZrCl_4$ may then be distilled off or discharged from the still bottom or, preferably, distilled from the pot residue through a short section of the column.

Although in the above examples packed distillation columns were utilized as the vapor-liquid fractionating apparatus, a number of the well-known modifications of this type of apparatus may be utilized with equally beneficial purification results. Thus, plate columns, sieve tray columns, film column, screen packed columns, packed columns untilizing other various packing shapes well-known in the distillation art, and a cascaded single step vaporizer-condenser apparatus may be utilized.

While argon was utilized to pressurize and purge the distillation equipment in the examples, other gases which will not contaminate the tetrachlorides may be used, for instance, helium, neon and krypton and, with a chemically resistant system, chlorine can be utilized as the inert gas.

As in the usual distillation art the distillation column may be designed to provide varying amounts of stripping section, i. e., the lower part of the column, or enriching section, i. e., the upper part of the column, so as to produce materials enriched in varying amounts in either of the compounds as desired. That is, with one design a pure zirconium tetrachloride containing very small amounts of hafnium can be obtained with the other product being enriched in hafnium component as in Example I or, with another design, essentially pure hafnium tetrachloride and pure zirconium tetrachloride may be obtained as shown. While the usual supplies of zirconium and hafnium tetrachlorides are found in mixtures containing approximately 2% of $HfCl_4$, this process is well suited to separation of mixtures having other proportions of these compounds.

Variations in and departures from the specific examples

I claim:

1. A process for the separation of zirconium tetrachloride from a mixture comprising tetrachlorides of zirconium and hafnium which comprises subjecting said mixture in the fluid state to fractional distillation under pressure equal to the equilibrium vapor pressure in a fractionating zone, regulating the temperature of the boiling liquid in the hot end of the fractionating zone in the range of from 455° C. to 520° C., and removing a zirconium tetrachloride product low in hafnium from the hot end of the fractionating zone and a product enriched in hafnium tetrachloride from the low temperature end of said zone.

2. A process for separating zirconium tetrachloride from its mixtures with hafnium tetrachloride which comprises injecting a vaporous mixture comprised substantially solely of zirconium tetrachloride and hafnium tetrachloride into an intermediate section of a distillation zone, operating said zone at autogenous vapor pressure, minimizing heat transfer to and from said zone, cooling the top of said zone to a temperature not lower than 440° C. to effect condensation of vapors whereby to form a downward flow of liquid metal chlorides in the column, heating the liquid at the hot end of said zone to a boiling point within the temperature range of from 460° C. to 495° C. to form vapor which rises in counter-current contact with the liquid stream in said zone, withdrawing substantially hafnium-free zirconium tetrachloride from the lower portion of said zone and a product enriched in hafnium tetrachloride from the top of said zone.

3. A process for separating zirconium tetrachloride low in hafnium chloride from a mixture containing zirconium and hafnium tetrachloride which comprises subjecting a fluid mixture of the tetrachlorides of hafnium and zirconium to fractional distillation in a closed fractionation zone under pressure while maintaining the temperature of the hot end of said zone in the range of from 455° C. to 520° C. and controlling the absolute pressure in said zone relative to said temperature at a value not less than 97% and not more than 103% of the values indicated by the equation $\log_{10}$ $$P \text{ mm. Hg} = \frac{-3406}{T_K^0} + 9.0421$$

4. A process for isolating substantially pure hafnium tetrachloride from its admixtures with major amounts of zirconium tetrachloride which comprises subjecting the mixture in a fluid state to fractional distillation under pressure in a distillation zone capable of about a 30 theoretical plate performance, maintaining a boiling temperature at the base of said zone in the range of from 460° C. to 512° C. and regulating the absolute pressure in said column relative to said temperature at values not less than 97% nor more than 103% of the values indicated by the equation $\log_{10}$ $$P \text{ mm. Hg} = \frac{-3406}{T_K^0} + 9.0421$$

cooling the vapors in the still head above said column at temperatures not less than 440° C. to condense a liquid phase for reflux to said column, taking substantially pure hafnium tetrachloride from the top of said column and a zirconium tetrachloride fraction from the lower portion of said column.

5. A process for separating substantially pure hafnium tetrachloride from its admixture with zirconium tetrachloride which comprises subjecting the mixed tetrachlorides in a fluid state to fractional distillation under pressure equal to the equilibrium vapor pressure in a fractionating zone, said fractionating zone capable of about a 30 theoretical plate performance, regulating the temperature of the boiling liquid in the hot end of the fractionating zone in the range of about 455° C. to 520° C. and removing a hafnium tetrachloride product low in zirconium tetrachloride from the top of said zone and a zirconium tetrachloride product depleted of its hafnium content from the bottom of said zone.

No references cited.